United States Patent Office 3,375,741
Patented Apr. 2, 1968

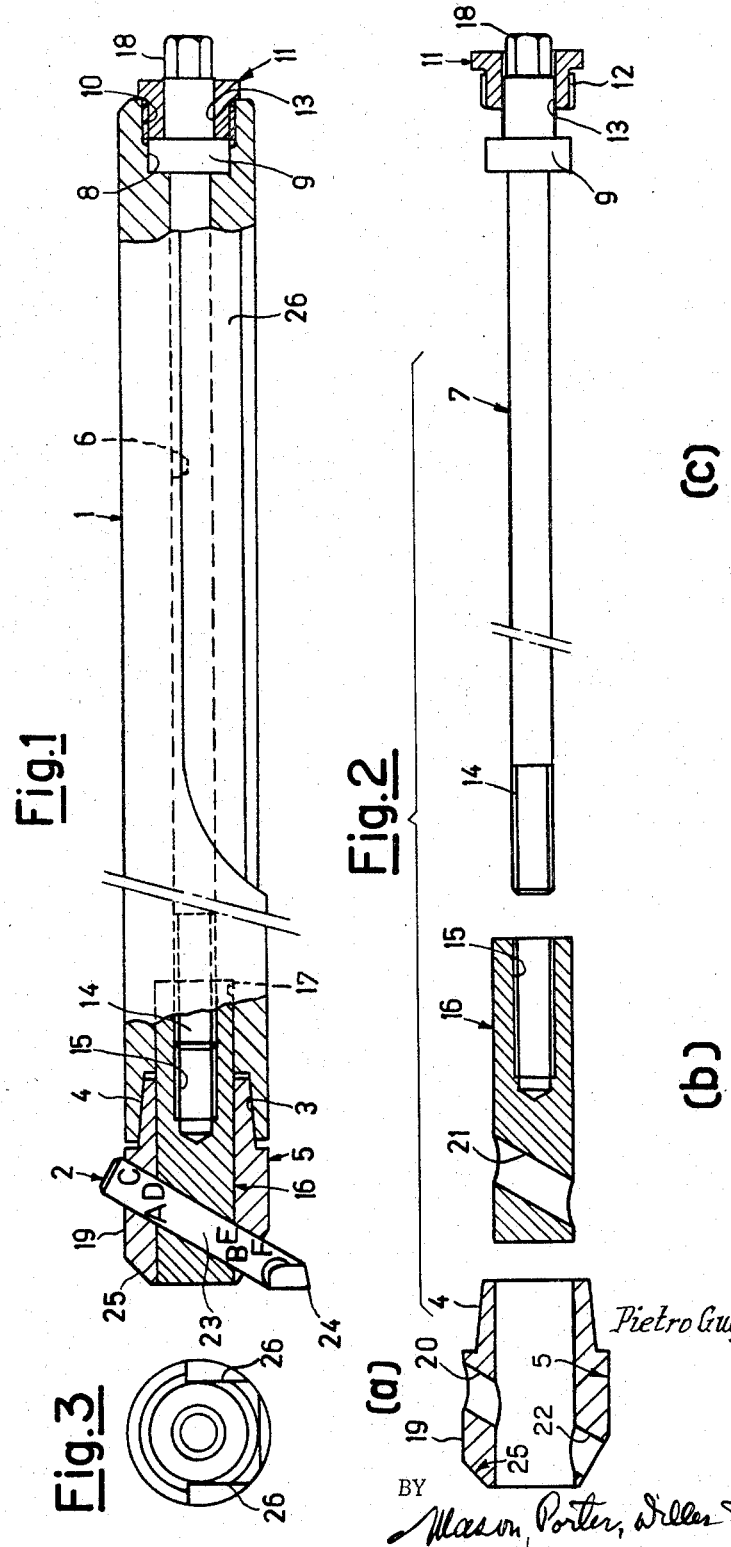

3,375,741
TOOLHOLDER, PARTICULARLY FOR LATHE-MACHINING OF DEEP HOLES
Pietro Guglielmetti, Via Riglio 16, Piacenza, Italy
Filed Dec. 20, 1965, Ser. No. 514,854
Claims priority, application Italy, Dec. 30, 1964,
7,004/64, Patent 107,897
6 Claims. (Cl. 77—58)

ABSTRACT OF THE DISCLOSURE

A toolholder adapted for use on a lathe in the machining of deep holes and including a cylindrical body, a bushing having a tapered tail portion housed in a seat in the body, a cylindrical block freely slidable in the bushing, the bushing and block having therein registering oblique bores for the mounting of the tool, and there being included a captive screw disposed axially in the body and threaded into the block to be operable in imparting relative movement to the block and bushing for releasably clamping the tool.

---

This invention relates to a toolholder, particularly for lathe-machining of deep holes.

The inventive toolholder, on account of its particular constructional features, facilitates internal machining operations which are usually rather toilsome and not always successful as to precision, with the conventional toolholders.

The inventive toolholder, in addition to solving in an accurate and final manner the specific machining problems for which it has been designed, affords economical and practical advantages due to its easy manufacture and the savings of costly materials, and also, in view of the particular clamping facilities it ensures the elimination of vibratory stresses.

The inventive toolholder is essentially characterized in that it comprises, in combination with a relatively thick-walled hollow cylindrical body, means for removably clamping the tool by merely resorting to frictional forces originated by the tendency of conjugated component parts of the device to be displaced in opposite directions and transversely of a composite seating provided for the tool's shank.

The inventive toolholder will be now described in more detail in connection with an exemplary embodiment thereof, as illustrated in the accompanying drawings, wherein:

FIGURE 1 is a side elevational view, partly in section, of the inventive toolholder, and FIGURE 2 is an exploded view of the several internal component parts of the toolholder, namely:

(a) a cylindrical bushing having a tapered tail portion and a sloped bore;

(b) a cylindrical body capable of being slidably engaged with the bushing (a), and having an axial, screw-threaded dead hole;

(c) a cylindrical stalk, having a screw-threaded end which can be screwed into the piece (b), and a ring-shaped enlarged portion.

FIGURE 3 is an elevational view of the end of the cylindrical body which receives the bushing.

Referring now to the above enumerated figures, the toolholder according to the invention comprises an outer substantially cylindrical body 1 wherein the parts a, b and c are housed. Said body 1 provides, at the end close to the tool 2, a conical seating 3 which houses the tapered tail portion 4 of the bushing 5 and, furthermore, a longitudinal smooth, centrally arranged bore 6 in which a stem 7 is allowed to slide. At its distal end, the body 1 offers a cylindrical seating 8 coaxial with the bore 6 and in which the ring-shaped enlarged portion 9 of the stem 7 can be housed, as shown in FIG. 1. The seating 8 has a screw-threaded mouth 10 wherein a ring-nut 11, (screw-threaded at 12 and having an axial smooth through-bore 13) can be screwed.

The stem 7 has an end 14 which is screw-threaded and can be screwably fastened to the axial screw-threaded bore 15, the latter being freely slidable within a specially provided axial counterbore or seating 17 of the body 1. The stem 7 has, at its end away of the screw-threaded end, a manipulation head 18 whose larger dimension does not exceed the diameter of the bore 13.

The bushing 5 has a cylindrical body 19 and the aforementioned tail portion 4. As will be apparent by reference to FIG. 1, the tail portion 4 of the bushing and the seating 3 of the body have congruent taperings.

Both the bushing 5 and the piece 16 have sloped bores 20, 22, and 21, respectively, having the same slope with respect to the long axis of the inventive toolholder, and preferably this angle is approximately 60°.

As the pieces 5 and 16 are arranged within the body 1 in a manner which will be detailed later, said sloped bores are substantially in registry, thus forming a single sloped bore (FIG. 1) wherein a tool 2, consisting of a shank 23 and the nose 24, can be clamped as will be explained hereinafter. The tool 2 juts forward of the bushing 5 in a chamfered portion 25 thereof.

The body 1 has two planes, both indicated as 26, for housing and clamping the tool in the machine-tool. See FIG. 3.

In the light of the detailed description of the inventive toolholder as given hereinabove, the clamping operation of said tool can be summarized as follows:

By rotating the head 18 and the stem 7 concurrently therewith (said stem having a rotational movement only since its portion 9 is rotatable but held captive against axial movement between the bottom of the seating 8 and the ring nut 11), the cylinder 16, the tool 2 and the bushing 5 are driven inwards until said bushing, with its tapered end 4 is firmly held in the toolholder 1.

Due to the drag impressed by the stem or drag-bar 7, the tool 2 is clamped along the whole contact line A–B on the cylinder 16 and along the sections CD and EF of the outer bushing 5.

Unclamping is effected by still acting on the end portion 18 of the stem or drag-bar 7 but in a reversed direction.

The operability of the stem 7 is not limited to locking the tool 2 in place but improves the working efficiency of the toolholder as a whole, in that it tends to counteract the thrust of the tool when at work.

I claim:

1. A toolholder adapted for use on a lathe in the machining of deep holes and comprising in combination a relatively thick-walled cylindrical body, and means for releasably clamping the tool by merely resorting to frictional forces due to the tendency towards displacements in opposite directions along conjugated surfaces of component parts of the device, transversely of a composite seating for the tool's shank, said releasable clamping means consisting of a bushing having a tapered tail portion, a cylindrical block freely slidable in the bushing, and a stem coaxial with said thick-walled cylindrical body and threaded in said block and rotatable while being held against movement longitudinally of said cylindrical body, the tapered tail portion of said bushing being housed in a conical seating provided in said body.

2. A toolholder according to claim 1, wherein said cylindrical block and said bushing have equally sloped bores which are in registry to form a single bore upon assembling and angular adjustment of the bushing and the block, said composite seating for the tool's shank being comprised of said obliquely aligned bores in the bushing and block, whereby due to the drag imparted by the stem when rotated tends to displace said block and said bushing with respect to one another and thus clamp the tool between opposite walls of the sloped single bore formed by said obliquely aligned bores, locking said tool and simultaneously locking the tapered tail portion of said bushing in its respective tapered seating.

3. A toolholder according to claim 2 wherein said stem has an annular enlargement which is seated between a chamber formed in said body and a ring nut screwably mounted in the open end of said chamber.

4. A toolholder according to claim 2 wherein the hollow cylindrical body has planar surfaces for mounting and clamping said toolholder on a machine-tool.

5. A toolholder according to claim 1, wherein said stem has an annular enlargement which is seated between a chamber formed in said body and a ring nut screwably mounted in the open end of said chamber.

6. A toolholder according to claim 1, wherein the hollow cylindrical body has planar surfaces for mounting and clamping said toolholder on a machine-tool.

References Cited

UNITED STATES PATENTS 874,027    12/1907    Nelson _____ 77—58

FOREIGN PATENTS 55,601    3/1911    Switzerland.

GERALD A. DOST, *Primary Examiner.*